(12) United States Patent
Perlin et al.

(10) Patent No.: US 12,546,672 B2
(45) Date of Patent: Feb. 10, 2026

(54) APPARATUS FOR DETERMINING SHEAR FORCES IN REGARD TO A PRESSURE IMAGING ARRAY, SINGLE POINT SENSOR FOR SHEAR FORCES, AND METHOD

(71) Applicants: Kenneth Perlin, New York, NY (US); Charles Hendee, Manteca, CA (US)

(72) Inventors: Kenneth Perlin, New York, NY (US); Charles Hendee, Manteca, CA (US)

(73) Assignees: New York University, New York, NY (US); Tactonic Technologies, LLC, New York, NY (US)

( * ) Notice: Subject to any disclaimer, the term of this patent is extended or adjusted under 35 U.S.C. 154(b) by 69 days.

(21) Appl. No.: 17/200,368

(22) Filed: Mar. 12, 2021

(65) Prior Publication Data

US 2021/0285835 A1    Sep. 16, 2021

Related U.S. Application Data

(60) Provisional application No. 63/109,612, filed on Nov. 4, 2020, provisional application No. 62/990,155, filed on Mar. 16, 2020.

(51) Int. Cl.
| | |
|---|---|
| *G01L 5/00* | (2006.01) |
| *G01L 1/20* | (2006.01) |
| *G01L 5/161* | (2020.01) |

(52) U.S. Cl.
CPC .............. *G01L 5/0052* (2013.01); *G01L 1/20* (2013.01); *G01L 5/161* (2013.01)

(58) Field of Classification Search
CPC .......... G01L 5/16; G01L 5/162; G01L 5/0052
See application file for complete search history.

(56) References Cited

U.S. PATENT DOCUMENTS

| | | | | |
|---|---|---|---|---|
| 5,313,840 | A  * | 5/1994  | Chen ................. | H01R 13/2414 73/767 |
| 6,812,903 | B1 * | 11/2004 | Sievenpiper ........ | H01Q 15/002 343/753 |
| 7,343,813 | B1 * | 3/2008  | Harrington ............. | G01L 1/146 73/780 |
| 7,516,671 | B2 * | 4/2009  | Liu ........................ | G01L 5/228 73/756 |
| 7,710,126 | B2 * | 5/2010  | Morimoto ............... | G01L 5/165 324/661 |
| 7,861,605 | B2 * | 1/2011  | Ogawa .................... | G01L 5/164 73/862.69 |
| 7,926,364 | B2 * | 4/2011  | Joung ..................... | G01L 5/228 73/862.046 |
| 8,250,926 | B2 * | 8/2012  | Yang ....................... | G01L 1/142 73/715 |
| 8,573,069 | B2 * | 11/2013 | Nishiwaki .............. | B25J 13/083 73/862.471 |

(Continued)

*Primary Examiner* — Tran M. Tran
(74) *Attorney, Agent, or Firm* — Ansel M. Schwartz

(57) ABSTRACT

A sensor having a layer and one or more sensing elements which sense shear force and compressive force on the layer. The sensor having a computer in communication with the one or more sensing elements which causes prompting signals to be sent to the one or more sensing elements and reconstructs shear force and compressive force on the layer from data signals received from the one or more sensing elements. A method for sensing forces. A method for producing a sensor.

5 Claims, 16 Drawing Sheets

(56) References Cited

U.S. PATENT DOCUMENTS

| | | | | |
|---|---|---|---|---|
| 8,613,231 B2* | 12/2013 | Muroyama | | G01L 5/228 |
| | | | | 73/862 |
| 8,800,385 B2* | 8/2014 | Ikebe | | G01L 5/161 |
| | | | | 73/862.041 |
| 8,820,173 B2* | 9/2014 | Clark | | A61B 5/002 |
| | | | | 623/20.14 |
| 9,158,369 B2* | 10/2015 | Grau | | G06F 3/045 |
| 9,182,302 B2* | 11/2015 | Lim | | G01L 1/18 |
| 9,205,561 B2* | 12/2015 | Ikebe | | G01L 5/009 |
| 9,347,838 B2* | 5/2016 | Chen | | G01L 1/142 |
| 9,360,959 B2* | 6/2016 | Perlin | | G06F 3/011 |
| 9,411,457 B2* | 8/2016 | Perlin | | G06F 3/045 |
| 9,459,712 B2* | 10/2016 | Ikebe | | B25J 13/082 |
| 9,524,020 B2* | 12/2016 | Perlin | | G06F 3/04144 |
| 9,700,258 B2* | 7/2017 | Jiang | | G01L 1/127 |
| 9,797,791 B2* | 10/2017 | Vogt | | G01L 1/02 |
| 10,267,690 B2* | 4/2019 | Wu | | G01L 5/165 |
| 10,345,984 B2* | 7/2019 | Perlin | | G06F 3/0304 |
| 10,365,172 B2* | 7/2019 | Tomita | | B25J 13/084 |
| 10,527,505 B2* | 1/2020 | Grau | | G01L 1/205 |
| 10,816,417 B2* | 10/2020 | Taniguchi | | G01L 1/205 |
| 10,901,545 B2* | 1/2021 | Perlin | | G06F 3/005 |
| 11,249,589 B2* | 2/2022 | Perlin | | G06F 3/04166 |
| 12,216,017 B2* | 2/2025 | Hussein | | G01L 5/162 |
| 2009/0320611 A1* | 12/2009 | Vasarhelyi | | B25J 13/084 |
| | | | | 73/862.046 |
| 2011/0193363 A1* | 8/2011 | Nishiwaki | | G01L 5/167 |
| | | | | 901/33 |
| 2012/0017703 A1* | 1/2012 | Ikebe | | G06F 3/0202 |
| | | | | 73/862.626 |
| 2012/0240691 A1* | 9/2012 | Wettels | | G01L 1/24 |
| | | | | 73/862.624 |
| 2014/0318270 A1* | 10/2014 | Yoneyama | | G01L 1/04 |
| | | | | 73/862.041 |
| 2015/0370398 A1* | 12/2015 | Perlin | | G06F 3/04144 |
| | | | | 345/173 |
| 2016/0283008 A1* | 9/2016 | Perlin | | G06F 3/0304 |
| 2017/0115171 A1* | 4/2017 | Huang | | A61B 5/6807 |
| 2019/0064011 A1* | 2/2019 | Wang | | G01L 1/2287 |
| 2019/0094087 A1* | 3/2019 | Rudy | | G01L 1/146 |
| 2019/0278317 A1* | 9/2019 | Nakae | | H01H 13/00 |
| 2022/0205853 A1* | 6/2022 | Nohno | | G01L 5/228 |
| 2022/0390305 A1* | 12/2022 | Ishizaki | | G01L 5/162 |

* cited by examiner

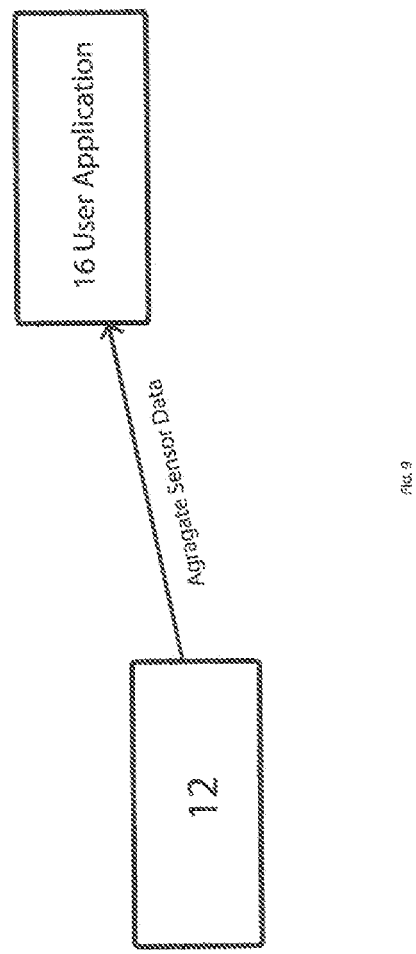

APPARATUS FOR DETERMINING SHEAR FORCES IN REGARD TO A PRESSURE IMAGING ARRAY, SINGLE POINT SENSOR FOR SHEAR FORCES, AND METHOD

CROSS-REFERENCE TO RELATED APPLICATIONS

This is a non-provisional of U.S. provisional patent application Ser. No. 62/990,155 filed Mar. 16, 2020 and U.S. provisional patent application Ser. No. 63/109,612 filed Nov. 4, 2020, both of which are incorporated by reference herein.

FIELD OF THE INVENTION

The present invention is related to a sensor having a layer and one or more sensing elements which sense shear force and compressive force on the layer. (As used herein, references to the "present invention" or "invention" relate to exemplary embodiments and not necessarily to every embodiment encompassed by the appended claims.) More specifically, the present invention is related to a sensor having a layer, one or more sensing elements which sense shear force and compressive force on the layer and a computer in communication with the one or more sensing elements which causes prompting signals to be sent to the one or more sensing elements and reconstructs shear force and compressive force on the layer from data signals received from the one or more sensing elements.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

In prior work we showed how to use a sparse array of compressive force sensing elements, such as Force Sensitive Resistive (FSR) elements, to create an image of compressive pressure that is antialiased, through the principle of Mechanical Force Interpolation (MFD). See U.S. Pat. No. 10,310,695, incorporated by reference, herein. To enable MFI, a raised bump is placed at the location of each compressive force sensing element. The presence of these bumps causes each 2×2 arrangement of neighboring compressive force sensing elements to act as a force plate. The effect of this innovation is that when pressure is applied to any point on the surface, the position of that point can be measured to an accuracy that is much finer than is the spacing between successive elements of the sensing array. For example, an FSR array that uses MFI with sensels arranged every 0.5" can typically measure the location of the center of pressure of an applied force to within a distance of about 0.01".

Such arrays can measure only compressive force—that is, force which is applied in a normal direction to the measuring surface. They are therefore. Insensitive to shear forces applied within the plane of the measuring surface.

Pressure imaging arrays generally measure only an image of pressure normal to the pressure imaging surface. A force sensor array that is able to measure local shear forces is able to provide valuable information that cannot be obtained from a force sensor array that measures only downward forces. For example, when designing an athletic shoe, it is important to be able to measure shear force where the bottom of the foot contacts the inside of the shoe, because high shear forces can cause stress to the materials of the shoe that can cause the shoe to tear apart. By accurately knowing shear force at different locations within the shoe, the shoe designers can reinforce the shoe in provide proper reinforcement without adding unnecessary weight.

Another use case is a multitouch sensor array. When a user places her hand upon a multitouch sensor array that measures only downward force, there is no way to measure lateral force of the fingers while a finger is pressing down upon a surface. In contrast, a force sensor array that also measures local shear forces can detect when a finger that is pressing upon the surface of the sensor is also applying lateral force. Such a sensor can act, for example, as a directional joystick controller for every finger that is pressing upon the surface.

BRIEF SUMMARY OF THE INVENTION

The present invention adds utility by replacing the compressive force sensing element at each raised bump preferably by three closely spaced compressive force sensing elements around that bump. With this arrangement, shear forces are able to be measured at the bump as differences in the measured pressure between those three compressive force sensing elements.

The present invention describes a way to enhance force measurement, so that an image of shear force in directions lateral to the surface can also be measured.

Furthermore, the present invention discloses a novel form or for the sensor array whereby the sensor is organized into flexible strips that extend outward from a central flexible spine. Electrical routing of both rows and columns for the scanning process is done along the length of each strip. This allows the strips to be individually wrapped around a curved surface. The sensed pressure and shear forces can therefore be applied to a shape with a complex and irregular curved surface, including a non-developable surface, such as a human foot.

Additionally, this novel form factor allows the sensor to be trimmed all around the edges to fit a custom curved shape, such as the shape of a human foot, without any loss in functionality at the individual sensels of the sensor array.

The present invention pertains to a sensor. The sensor comprises a layer. The sensor comprises a plurality of sensing elements which sense shear force and compressive force on the layer. The sensor comprises a computer in communication with the sensing elements which causes prompting signals to be sent to the sensing elements and reconstructs shear force and compressive force on the layer from data signals received from the sensing elements.

The present invention pertains to a method for sensing forces. The method comprises the steps of applying a force to a layer. There is the step of sending prompting signals to a plurality of sensing elements by a computer. There is the step of receiving data signals from the sensing elements by the computer. There is the step of identifying shear force and compressive force of the force on the layer by the computer from the data signals received from the sensing elements.

The present invention pertains to a sensor. The sensor comprises a plurality of sensing elements that are in contact with a set of bumps that are in contact with a grid of wires disposed on a base. The sensor comprises a layer, so that force imparted onto the layer is transmitted to the bumps, and thence to the grid of wires which are thereby compressed between the base and the bumps. The sensor comprises a computer in communication with the grid which causes prompting signals to be sent to the grid and determines shear force and compressive force on the surface from data signals received from the grid.

The present invention pertains to a sensor. The sensor comprises a layer. The sensor comprises a sensing element which senses shear force and compressive force on the layer. The sensor comprises a computer in communication with the sensing element which causes prompting signals to be sent to the sensing element and reconstructs shear force and compressive force on the layer from data signals received from the sensing element.

The present invention pertains to a method for sensing forces. The method comprises the steps of applying a force to a layer. There is the step of sending prompting signals to a sensing element by a computer. There is the step of receiving data signals from the sensing element by the computer. There is the step of identifying shear force and compressive force of the force on the layer by the computer from the data signals received from the sensing element.

The present invention pertains to a method for producing a sensor. The method comprises the steps of printing lateral electrical connecting lines along a spine. There is the step of printing a layer of dielectric insulator on the lateral electrical connecting lines. There is the step of printing vertical electrical connecting lines along the spine, where the dielectric insulator is omitted only where the lateral electrical connecting line connects to a corresponding vertical connecting line along the spine to ensure each lateral electrical connecting line is isolated from the vertical electrical connecting lines along the spine.

BRIEF DESCRIPTION OF THE SEVERAL VIEWS OF THE DRAWING

In the accompanying drawings, the preferred embodiment of the invention and preferred methods of practicing the invention are illustrated in which:

FIG. 9 is a block diagram of a controller in communication with a user application.

DETAILED DESCRIPTION OF THE INVENTION

Figure 1:
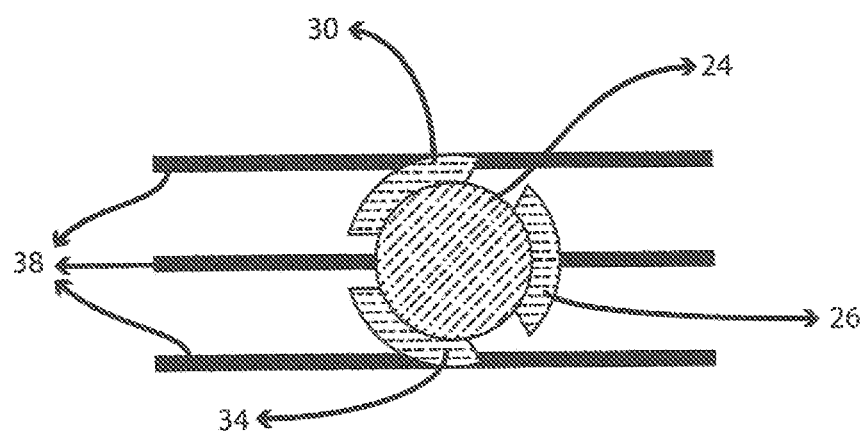
FIG. 1 shows a cluster of three force measuring patches below, and laterally offset from one bump of the present invention.
Figure 2:
FIG. 2 shows an upper sheet.
Figure 3:
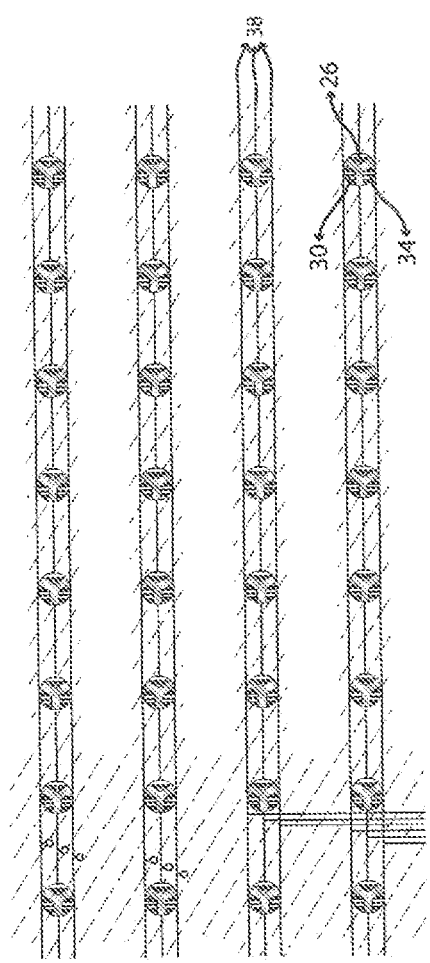
FIG. 3 is an expanded view of the upper sheet, showing rows 3-6 in columns 9-15.
Figure 4:
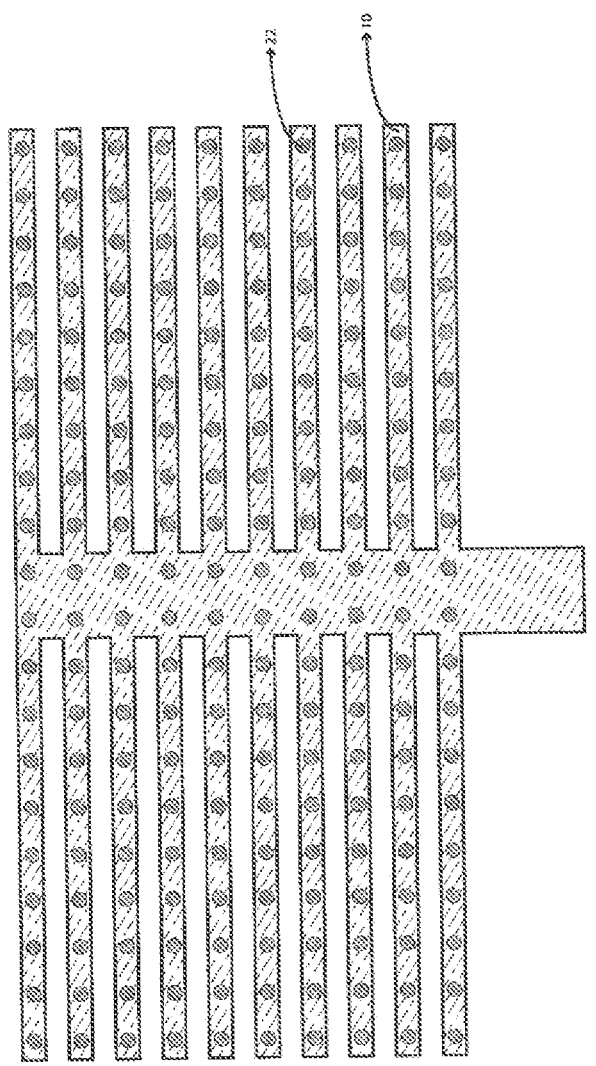
FIG. 4 shows connections for the 20 columns of a lower sheet.
Figure 5:
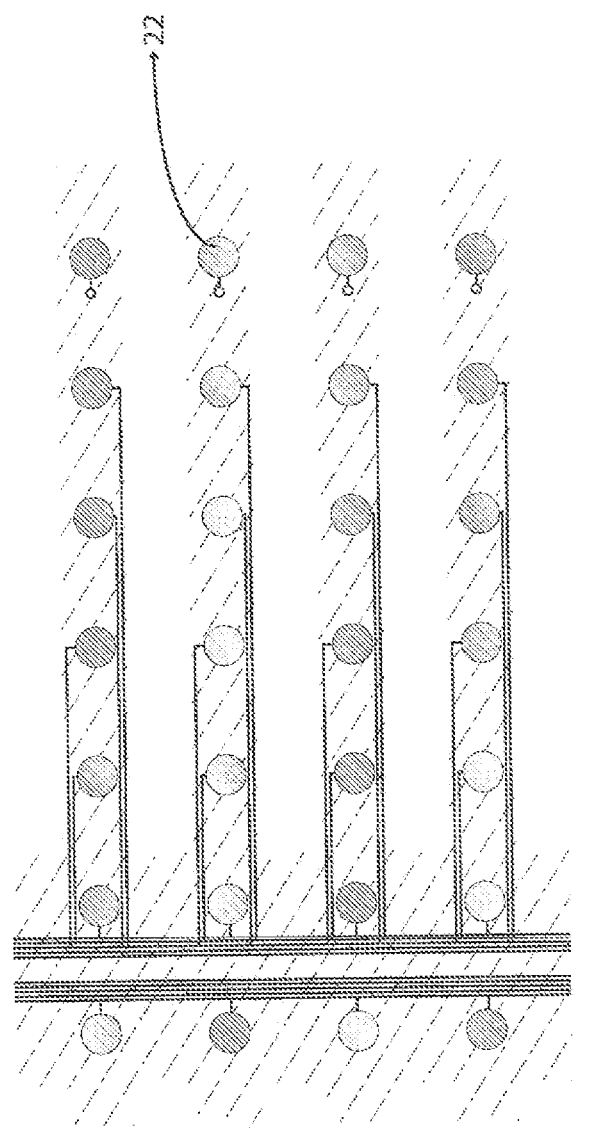
FIG. 5 shows an expanded view of the lower sheet, showing rows 3-6 and columns 9-15.

Referring now to the drawings wherein like reference numerals refer to similar or identical parts throughout the several views, and more specifically to FIGS. 1-5 thereof, there is shown a sensor 10. The sensor 10 comprises a layer 20. The sensor 10 comprises a plurality of sensing elements 22 which sense shear force and compressive force on the layer 20. The sensor 10 comprises a computer 12 in communication with the sensing elements 22 which causes prompting signals to be sent to the sensing elements 22 and reconstructs shear force and compressive force on the layer 20 from data signals received from the sensing elements 22.

Figure 6:
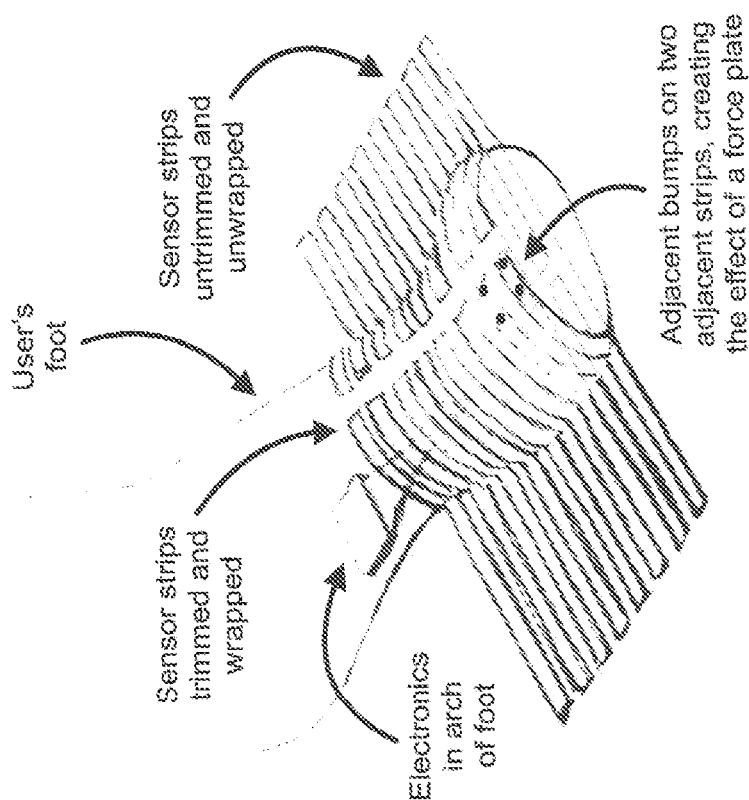
FIG. 6 shows sensor strips wrapped around a complex curved object.
Figure 7:
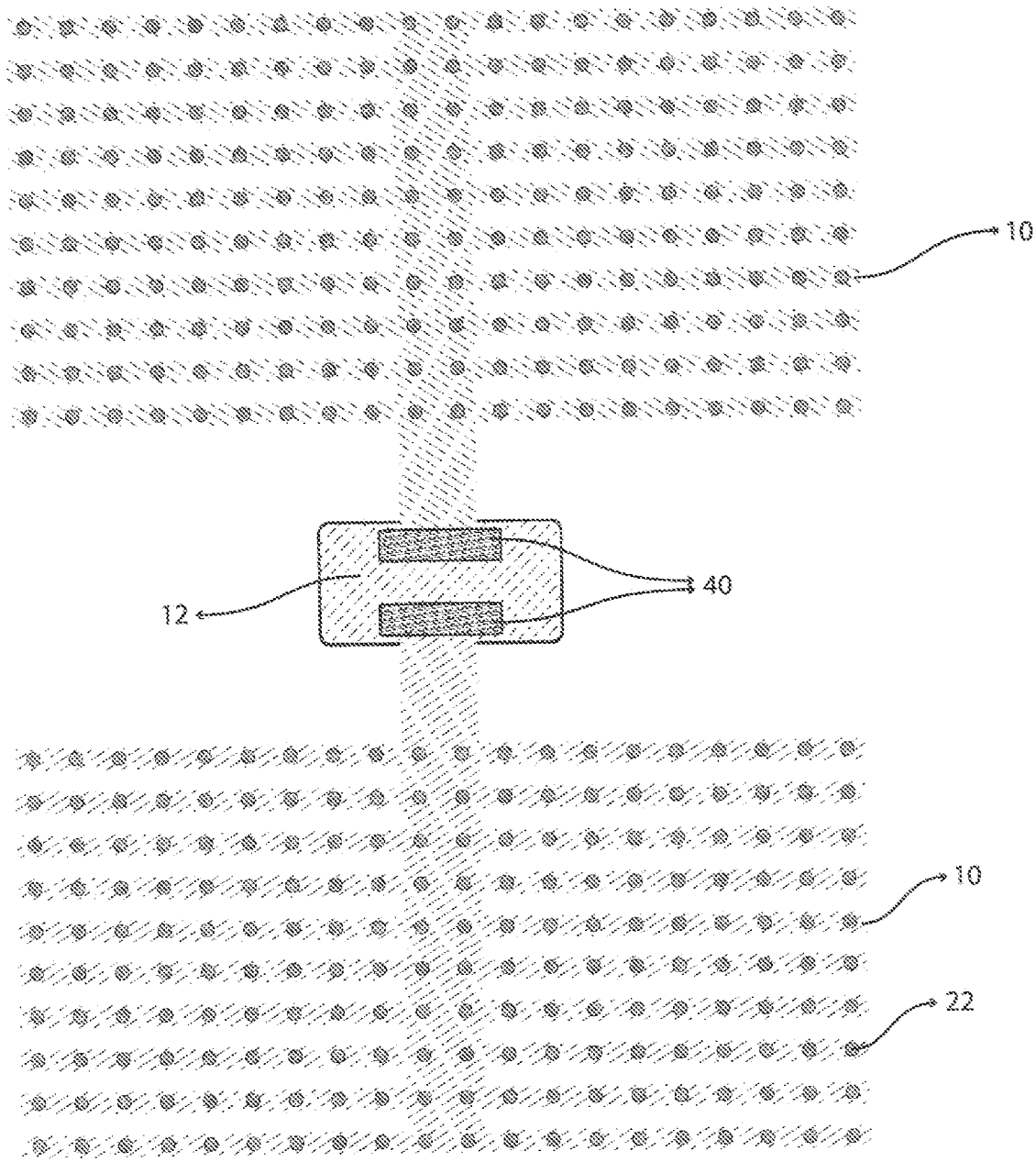
FIG. 7 shows conducting lines connected to electronics of the present invention.
Figure 8A:
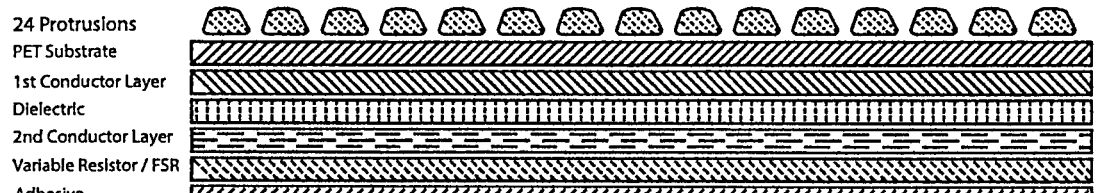
FIG. 8A shows a cross-section of a top sheet.
Figure 8B:
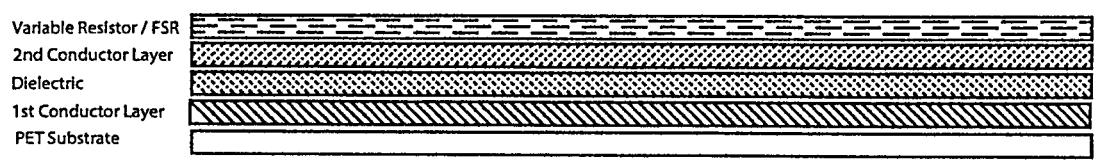
FIG. 8B shows a cross-section of a bottom sheet.
Figure 10:
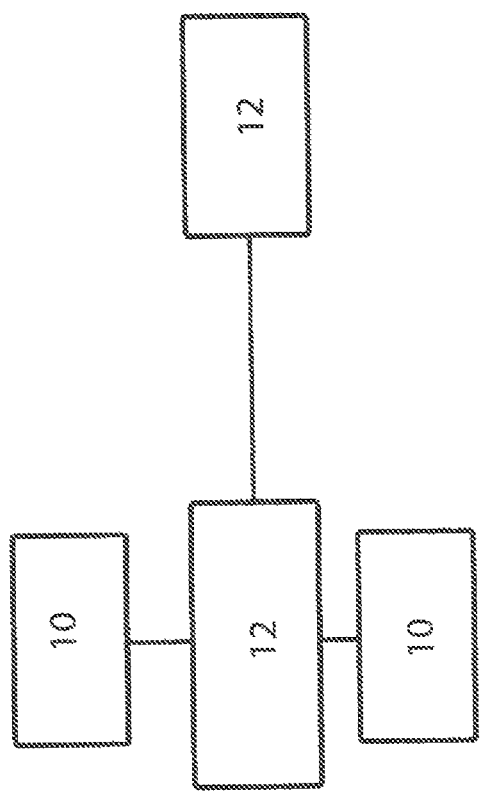
FIG. 10 is a block diagram of a controller in communication with a computer, a front sensor and a rear sensor.

The sensor 10 may include a bump 24 with each sensing element 22. Each sensing element 22 may include a first patch 26 having at least a portion 28 disposed under the bump 24, a second patch 30 having at least a portion 32 disposed under the bump 24, and a third patch 34 having at least a portion 36 disposed under the bump 24. The computer 12 may reconstruct a continuous position of shear force on the layer 20 from interpolation based on the data signals received from the grid and across and in between the sensing elements 22 as the force moves from one sensing element 22 to another sensing element 22. The plurality of sensing elements may be disposed in sensing strips, as shown in FIG. 6. The sensing strips are adapted to wrap around a curved object. The sensing strips may be adapted to wrap around a foot, and the computer is adapted to be positioned in an arch of the foot.

The present invention pertains to a method for sensing forces. The method comprises the steps of applying a force to a layer 20. There is the step of sending prompting signals to a plurality of sensing elements 22 by a computer 12. There is the step of receiving data signals from the sensing elements 22 by the computer 12. There is the step of identifying shear force and compressive force of the force on the layer 20 by the computer 12 from the data signals received from the sensing elements 22.

The present invention pertains to a sensor 10. The sensor 10 comprises a plurality of sensing elements 22 that are in contact with a set of bumps that are in contact with a grid of wires 38 disposed on a base. The sensor 10 comprises a layer 20, so that force imparted onto the layer 20 is transmitted to the bumps, and thence to the grid of wires 38 which are thereby compressed between the base and the bumps. The sensor 10 comprises a computer 12 in communication with the grid which causes prompting signals to be sent to the grid and determines shear force and compressive force on the surface from data signals received from the grid.

The sensor 10 may include a bump 24 with each sensing element 22. Each sensing element 22 may include a first patch 26 having at least a portion 28 disposed under the bump 24, a second patch 30 having at least a portion 32 disposed under the bump 24, and a third patch 34 having at least a portion 36 disposed under the bump 24. The computer 12 may reconstruct a continuous position of shear force on the layer 20 from interpolation based on the data signals received from the grid and across and in between the sensing elements 22 as the force moves from one sensing element 22 to another sensing element 22.

The present invention pertains to a sensor 10. The sensor 10 comprises a layer 20. The sensor 10 comprises a sensing element 22 which senses shear force and compressive force on the layer 20. The sensor 10 comprises a computer 12 in communication with the sensing element 22 which causes prompting signals to be sent to the sensing element 22 and reconstructs shear force and compressive force on the layer 20 from data signals received from the sensing element 22.

The sensor 10 may include a connector 40 which connects the sensing elements 22 to the computer 12. The sensor 10 may include a charge 42/dataport 44 in communication with the computer 12. The sensor 10 may include a battery 46 in communication with the charge 42/dataport 44 and the computer 12. The sensor 10 may include a wireless transmitter 48 in communication with the computer 12. The sensor 10 may include a housing 50 in which the computer 12, battery 46, charge 42/dataport 44, wireless transmitter 48 and connector 40 are disposed. The sensor 10 may be a physical controller for a computer 12 cursor.

Figure 16:
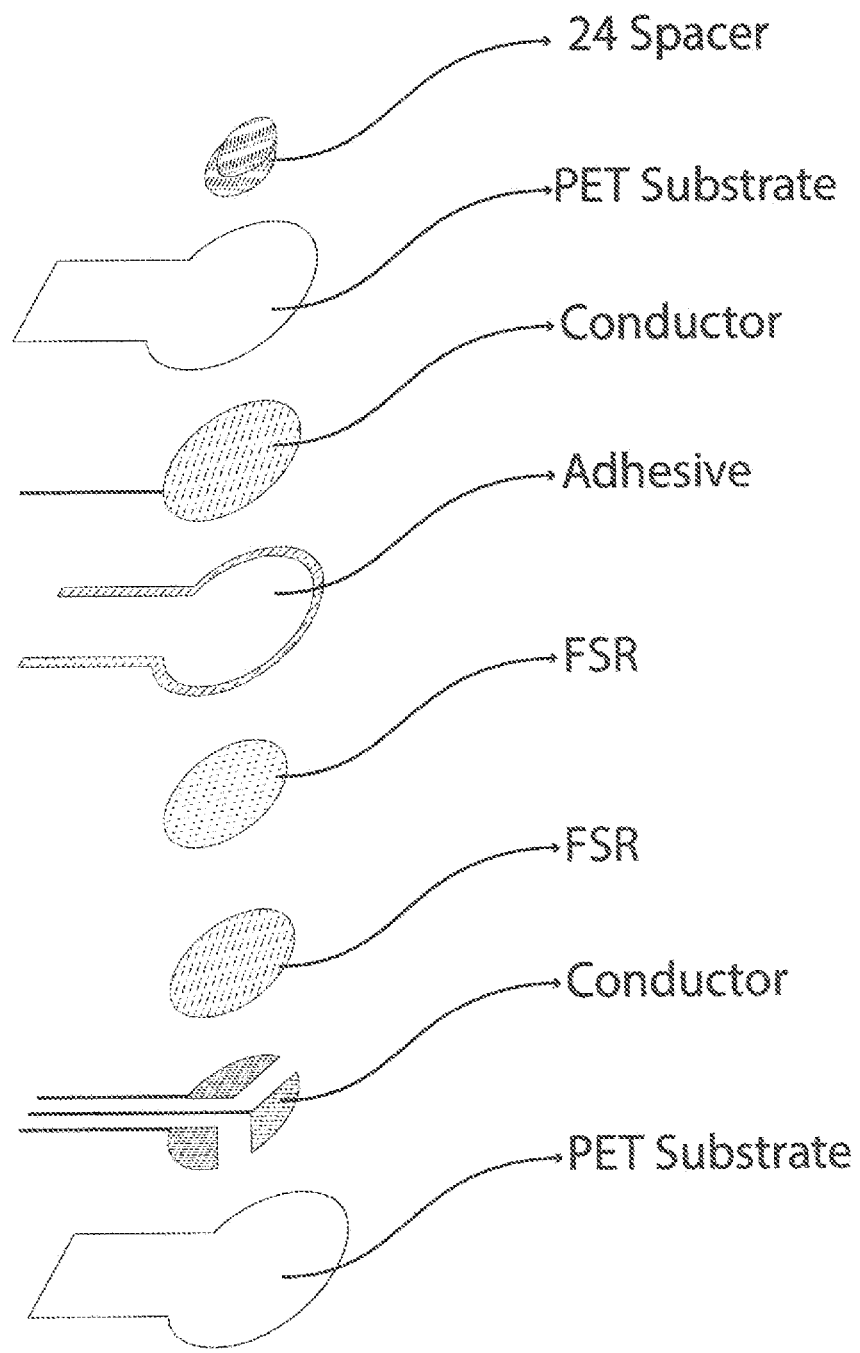
FIG. 16 is an exploded view of the sensor elements.

The sensor element, as shown in FIG. 16, may comprise a PET substrate. The sensor element may comprise a first conductor having a first portion, a second portion distinct and apart from the first portion, and a third portion distinct and apart from the first portion and the second portion, the first and second and third portions positioned about a center point, the conductor disposed on and directly in contact with the PET substrate. The sensor element may comprise a first FSR patch in direct contact with the first and second and third portions of the conductor; a second FSR patch in direct contact with the first FSR patch. The sensor element may comprise an adhesive portion in direct contact with the second FSR portion. The sensor element may comprise a second conductor in direct contact with the adhesive portion. The sensor element may comprise an upper substrate in direct contact with the second conductor. The sensor element may comprise a spacer in direct contact with the upper substrate.

The present invention pertains to a method for sensing forces. The method comprises the steps of applying a force to a layer 20. There is the step of sending prompting signals to a sensing element 22 by a computer 12. There is the step of receiving data signals from the sensing element 22 by the computer 12. There is the step of identifying shear force and compressive force of the force on the layer 20 by the computer 12 from the data signals received from the sensing element 22.

The present invention pertains to a method for producing a sensor. The method comprises the steps of printing lateral electrical connecting lines along a spine. There is the step of printing a layer of dielectric insulator on the lateral electrical connecting lines. There is the step of printing vertical electrical connecting lines along the spine, where the dielectric insulator is omitted only where the lateral electrical connecting line connects to a corresponding vertical connecting line along the spine to ensure each lateral electrical connecting line is isolated from the vertical electrical connecting lines along the spine.

Internal Operation

One embodiment of the present invention comprises an array of 20 rows×20 columns of sensing elements 22. This arrangement essentially upgrades a sensing array which measures compressive forces, so that the sensing array will also measure shear forces. In a preferred embodiment the architecture of an FSR based sensor 10 array that has 10 rows×20 columns of sensing elements 22 is modified by replacing each row with 3 rows. Shear forces can be measured as differences in the sensed value within clusters of three closely spaced but electrically unconnected FSR regions placed in an equilateral configuration around a small raised bump 24. In particular, lateral force upon the bump 24 causes the bump 24 to tilt, which causes a different downward force to be applied by the portion 28 of the bump 24 which lies above each of the three patches. Thus, the forces applied to the three conductor patches determine the direction and magnitude of the total shear force on that particular sensing node set. The direction of the shear force is determined by the following equation: d=a tan 2(Fy,Fx), where Fy=(B−C)*√3/2 & Fx=A−(B+C)/2 and where A, B, & C are the magnitude of the forces of the individual FSR regions. The magnitude of the force is determined by the following equation: M=sqrt(Fx*Fx+Fy*Fy).

In one embodiment, the three FSR regions fit within a circular disk of radius 1.5 mm, the centroids of each FSR region are each approximately 1.0 mm away from the center of the bump 24, and the radius of the raised bump 24 is 1.0 mm, where the bump 24 is 250 microns in height above the substrate.

Let A,B,C be the respective force measured at sensing elements 22 which are offset in directions Θ=0, 2π/3, 4π/3 around the bump 24, respectively. Then:

Downward pressure applied normal to the surface at the bump 24 can be measured as: Fz=A+B+C Shear pressure applied in the x direction lateral to the bump 24 can be measured as: Fx=A−(B+C)/2

Shear pressure applied in the y direction lateral to the bump 24 can be measured as: Fy=(B−C)×√3/2

If a person presses her finger down upon the bump 24, and then applies lateral pressure, Fx and Fy can be used to measure shear force, as though the user is using a directional joystick.

In particular, the resulting shear force is defined by:

Direction=$a \tan 2(Fy, Fx)$//arc tangent function with 2 arguments

Magnitude=sqr($Fx*Fx+Fy*Fy$)

EXAMPLE EMBODIMENT

One embodiment is in the form of a foot sensor 10. Electronics are placed in the arch of the foot. Two sensor arrays are used to sense forces around the foot. One sensor 10 array is placed forward of the arch to measure forces for the front part of the foot, and the other sensor array is placed behind the arch to measure forces around the heel. Only the front sensor array is described, since the rear sensor array is essentially the same as the front sensor array.

The sensor array consists of two sheets of flexible plastic, upon which are printed silver electrically conductive traces, patches of conductor, and small raised bumps. All of the foregoing is standard for FSR sensing arrays that interpolate force by MFL. The novelty of the current invention lies in a novel arrangement of these elements.

Both the upper and lower plastic sheets consist of a central spine that runs in the center under-neath the user's foot, which extends forward from the electronics which are located within the arch of the foot to the toes of the foot, as well as a set of 10 4" long strips that extend perpendicularly out to the left of this spine, and a corresponding set of 10 4" long strips that extend perpendicularly out to the right of the spine.

These strips are long enough so that they can wrap around the sides and over the top of the user's foot. In this way, forces can be sensed on the sides and the top of the foot, in addition to the bottom of the foot.

There are 10 pairs of strips, with each pair numbered 0 through 9 from bottom to top. Each left/right pair of strips constitutes 3 rows of 20 columns (10 columns in the left strip, and 10 columns in the right strip).

In strip pair j, the 3 successive rows 3j, 3j+1, 3j+2 are enabled to read out the C, A and B conductive patch in each conductive cluster, respectively. As rows 0 through 29 are successively enabled, and all as 20 columns are successively enabled within each currently enabled row, the pressure value is thereby read at each of the 600 FSR patches.

This is sufficient information to measure the downward force, the lateral force in the x direction (toward the right side of the foot), and the lateral force in the y direction (toward the front of the foot) at each of the 200 bumps.

The location of the center of pressure of any force applied to the sensor surface can then be computed along all three of these axes by bilinear interpolation, as is standard practice for Interpolation based on the principle of MFI for FSR sensor arrays.

Connection for the 30 Rows of the Upper Plastic Sheet

In the preferred embodiment, 15 of the lines along the central spine run along the under surface of a central spine of the plastic sheet. These connect to the bottom 15 rows, which are contained within the bottom 5 strips. The other 15 lines run along the upper surface of the central spine of the plastic sheet. These then pass through vias (a via is a hole in the plastic sheet which allows an electrical connection from one surface of the sheet to the opposite surface, shown in blue) to the under surface of the central spine of the plastic sheet, where they connect to the top 15 rows, which are contained within the top 5 strips, three rows per strip.

Connections for the 20 Columns of the Lower Plastic Sheet

The rightmost half of the connections for the 20 columns, showing only the 10 column connections that go from the right half of the central spine outward toward the strips.

The first 5 connections on the right side along the spine run along the upper surface of the plastic sheet, and connect to the 5 innermost columns along each strip. The last 5 connections on the right side along the spine are on the under surface of the plastic sheet, and run along the under surface of each strip until they pass through vias to the upper surface of each strip (shown in blue), where they connect to the 5 outermost columns of each strip.

In order to ensure that each lateral connecting line from the spine to a target column is electrically isolated from the vertical connecting lines along the spine, the lateral connecting lines are printed first, and then a layer 20 of dielectric insulator is printed afterward, and finally the printing of the vertical connecting lines along the spine. The dielectric is omitted only where the lateral connecting line connects to the corresponding vertical line along the central spine.

In order to maintain electrical isolation between the upper and lower sheets, a second layer 20 of dielectric is printed over the all-exposed connection lines, excepting the areas where FSR pads are printed.

Wrapping the Strips Around a Complex Curved Object

Given an object with complex curves, such as a human foot, the strips of the sensor array can be trimmed to an optimal length and then wrapped around the object, as shown in the accompanying figure. In this example, a similar wrapping procedure (not shown) would be done for the sensor array in the rear part of the foot.

This innovation allows the mechanical force interpolation to be effective even on shapes that contain complex non-developable curved surfaces.

Although the resulting geometry is non-planar, the resulting configuration allows adjacent bumps on adjacent strips to align side by side, so that collectively they form 2×2 arrangements of bumps, creating the effect of a two-dimensional array of small force plates.

Connecting the Conducting Lines to the Electronics

Each of the two sheets of plastic has conducting lines along both their top and their bottom sur-faces. The upper plastic sheet has 15 lines on its top surface, and 15 lines on its bottom surface. The lower plastic sheet has 10 lines on its top surface, and 10 lines on its bottom surface. Therefore, the total number of lines in the described embodiment is 50. The 25 lines which are on the bottom surface need to be moved to the top surface so that all 50 lines can connect to the electronics. This is done by placing vias within the tail ribbon of each plastic sheet, as is standard practice for FSR sensor arrays which have conducting lines on both the top and bottom surfaces of their plastic substrate.

Parts for One Embodiment

Sensor Film
    Substrate (generally a PET), conductive material for signal traces (such as λg/silver based solutions), dielectric, pressure variable resistance material (FSR), adhesive, spacer, stiffener
    Substrate—DuPont Melinex ST505 5mil (127 μm/5 mil)
    Conductor—DuPont PE825 Conductor Paste
    Variable Resistance—DuPont 7082 Resistor Paste & DuPont 5036 Dielectric Paste
    Adhesive—KIWO Printable PSA TC2500/1
    Spacer—Norcote UVS-161
    Stiffener—10 mil Kapton Polyimide tape
Control Electronics:
    One embodiment BOM for controller.

| Comment | Description | Manufacturer | Manufacturer Part Number |
| --- | --- | --- | --- |
| Cap | Capacitor | | C1005X7R1H104K |
| Cap | Capacitor | | CGJ2B2C0G1H101J |
| Cap | Capacitor | | C1005X5R0J475M |
| Cap Pol3 | Polarized Capacitor (Surface Mount) | AVX | TCJA106M010R0300 |
| Pot | 74HC4051 quad pot, 14-Pin TSSOP, Extended Temperature | Microchip Technology | MCP4362-103E/ST |
| Ferrite Bead | Inductor | Bourns | MU1005-600Y |
| COM0 | Buffers & Line Drivers 3V Full-Dpix Driver and Receiver | TI | SN65HVD33DR |
| LED02 | Typical RED GaAs LED | Avago Technologies | HSMC-C170 |
| Mux | Multiplexer Switch ICs 16:1 25 MHz 2.5 Ohm CMOS | Analog Devices | ADG706BRUZ |

-continued

| Comment | Description | Manufacturer | Manufacturer Part Number |
| --- | --- | --- | --- |
| FH28-50S-0.5SH(05) | | Hirose | FH28-50S-0.5SH(05) |
| Res | Resistor | Vishay | CRCW04021K00FKEDHP |
| Res | Resistor | Vishay | CRCW040210K0JNEDHP |
| Res | Resistor | Vishay | CRCW040210R0FKEDHP |
| Res | Resistor | Vishay | CRCW0402270RFKED |
| SPDT | FSA2267 Low-Voltage, Dual-SPDT | | FSA2267AL10X |
| Conn 1 | 9 pin PPC Connector | Molex | 0527450997 |
| PIC24HJ256GP610-I/PT | High Speed General Purpose 16-Bit Flash Microcontroller, 256 KB Flash, 16 KB RAM, 100-Pin TQFP, Industrial Temperature, Tape and Reel | Microchip Technology | PIC24HJ256GP610-I/PT |
| TS912AIDT | Operational Amplifiers~ Op Amps Dual Rail-to-Rail 3V | STMicroelectronics | TS912AIDT |
| Volt Reg | Voltage Regulator | Infineon | IFX25001ME V33 |
| Bluetooth LE Module | Bluetooth LE Module | Microchip Technology | RN4020-V/RMBEC133 |

Single Point Sensor 10 for Both Downward and Shear Forces

Figure 11:
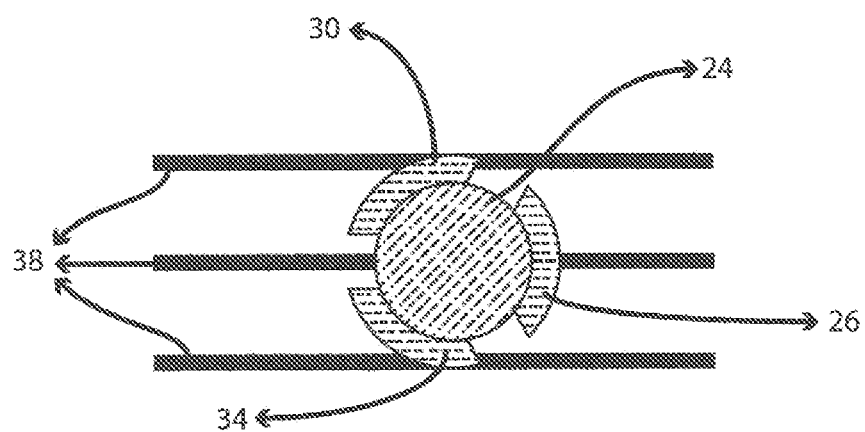
FIG. 11 shows a cluster of three force measuring patches below and laterally offset from one bump of a single point sensor.

Described below is an enablement for a small and flat form factor portable sensor device that can simultaneously measure both downward force and two dimensions of lateral or shear force impinging upon a single point, which is based on the details described above. In a preferred embodiment, the sensor 10 in FIG. 11, which converts sensed pressure into three variable resistance outputs, is coupled with a bluetooth wireless transmitter 48.

Let A, B, C be the forces at sensing elements 22 offset in directions $\Theta=0$, $2\pi/3$, $4\pi/3$ around the bump 24. Then:

Shear pressure applied in the x direction lateral to the bump 24 can be measured as $Fx=A-(B+C)/2$ Shear pressure applied in the y direction lateral to the bump 24 can be measured as $Fy=(B-C)\times\sqrt{3}/2$ Downward pressure applied normal to the surface at the bump 24 can be measured as $Fz=A+B+C$ If a person presses her finger down upon the bump 24, and she then applies lateral pressure, Fx and Fy will measure shear force, as though the user is using a directional joystick.

The resulting shear force is defined by:

Direction=$a$ tan 2$(Fy, Fx)$//arctan with 2 arguments

Magnitude=sqrt$(Fx*Fx+Fx*Fy)$

Components:
  Sensor element
  Microprocessor
  Bluetooth transmitter
  Electrical power source
  Adhesive backing
  Physical surface upon which to mount the device
  External computing platform (for example, a SmartPhone or a personal computer) that incorporates a Bluetooth receiver Sensor Element Components (see FIG. 16):
  Substrate (PET. MyLar, etc.)
  Signal conducting Traces (Printed silver [e.g., DUPONT 5025], Printed or Etched copper, or other technique)
  Dielectric material (eg., DUPONT 5036)
  Force varying resistor material (Piezoelectric, carbon based FSR, etc [e.g., DUPONT 7082 carbon ink)
  Adhesive (e.g., printed PSA such as 3M's 300lse psa or 3M SP7555)
  Physical spacing material (e.g., Norcote uvs-161)

In one embodiment we use the materials listed above by part number: Dupont 5025 for consecutive material, Dupont 5036 for dielectric material, Dupont 7082 (can be blended with the 5036 to change resistance sensitivity and range) for variable resistance, Norcote's uvs-161 for the print-ed spacer dome, 3M SP7555 for a printable adhesive, and a polyethylene terephthalate (PET) the is either 5 or 7 mills in thick depending on the desired final thickness. Each layer 20, when deposited on the PET (in this embodiment, materials are deposited using standard functional screen printing and curing techniques) has a thickness of 0.002"-0.005" for the adhesive and approximately 0.005" for the signal traces, dielectric and fsr.

User Experience when Used as a Joystick Controller:
  1. The user places a finger upon the device, then presses down and wiggles the finger.
  2. The device remains physically in place with respect to the mounting surface, due to the adhesive backing.
  3. The cursor on the screen of the computer 12 moves in response to the forces exerted by the user: (a) press/release results in mouse-click/mouse-release; (b) west/east shear results in left/right movement of the cursor location on the computer screen; (c) north/south shear results in up/down movement of the cursor location on the computer screen.

Internal Step-by-Step Operation:
  1. The forces impinged on the sensor 10 by the user cause continuous variation in electrical resistance in three analog voltages.
  2. The microprocessor periodically samples the three analog voltages, converting them to three digital values.
  3. The microprocessor instructs the Bluetooth module to transmit the three digital values,
  4. The computer 12 receives the transmitted digital signal.
  5. Software on the computer 12 converts increased/decreased downward force to mouse press/release, west/cast shear to left/right cursor movement, and north/south to up/down cursor movement. In particular:

As downward force that is increasing over time first transitions to become greater than a predefined force threshold, the computer software invokes an onPress( ) mouse event. Conversely, as downward force that is decreasing over time first transitions to become less than a predefined force threshold, the computer software invokes an onRelease( ) mouse event.

Lateral force Fx and Fy along the x and y axes of the device, respectively, are translated by computer software into changes of cursor position as follows:

$$x\mathrel{+}=Fx$$

$$y\mathrel{+}=Fy$$

In addition, both the downward and lateral forces at any moment in time can be made available to the computer software for use by the application developer as either values of variables or as return values of function calls.

Figure 12:
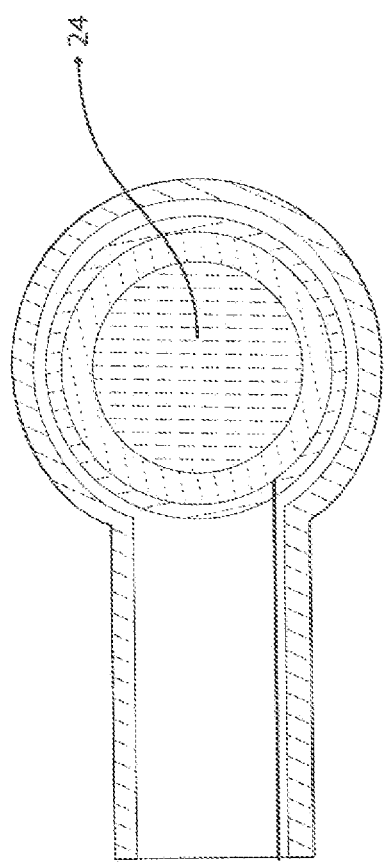
FIG. 12 and FIG. 13 show a top-down view of each sensor half, respectively.
Figure 13:
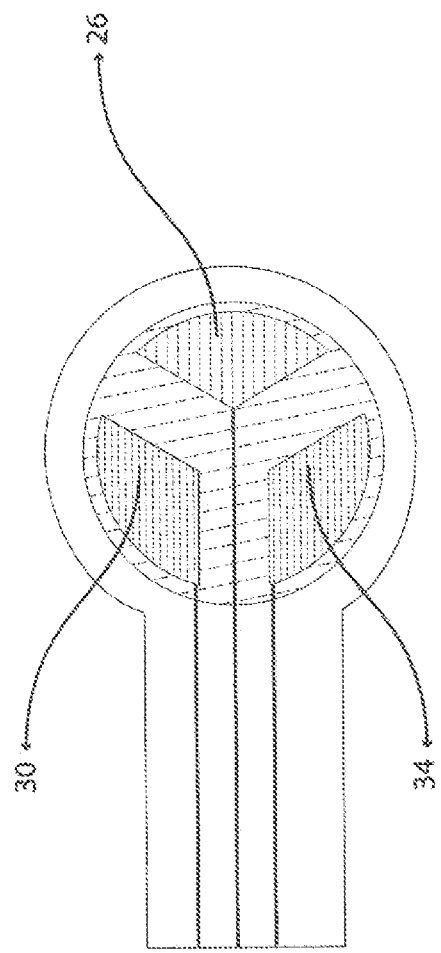
Figure 14:
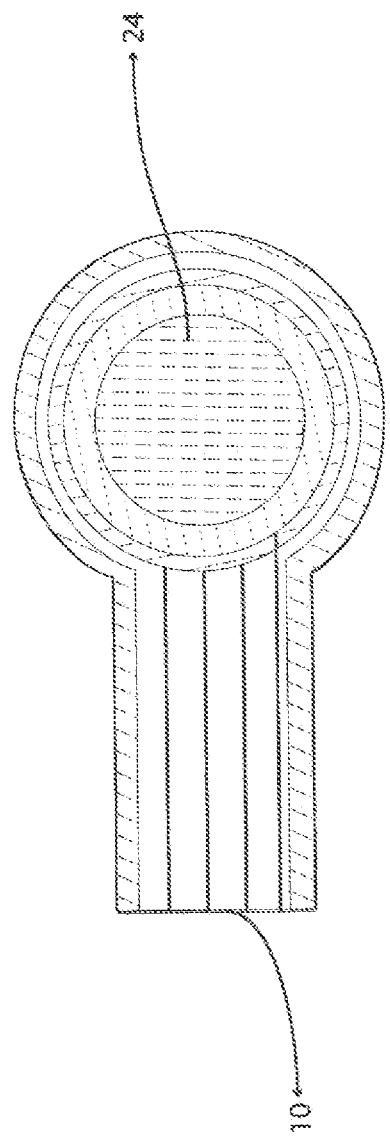
FIG. 14 shows each sensor half assembled.

More detailed description of preferred embodiment (including physical dimensions):

The preferred embodiment is a disk ¾ in diameter sensing area with tail leads (Sec FIGS. 12-14), although the form factor can vary in size from as small as V/a diameter to 1 inch or larger and vary in shape.

Figure 15:
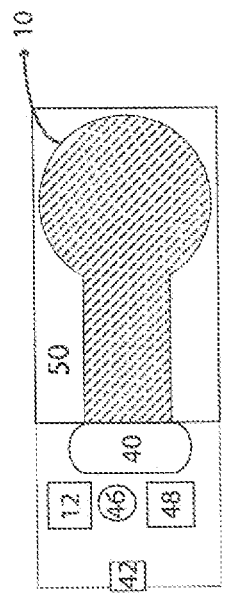
FIG. 15 is a schematic representation of a joystick of the present invention.

The sensor 10 is connected to a controller via standard connectors. FFC/FPC connectors are used in this embodiment, but others would work, such as a clincher connector. The controller includes an ADC, battery 46 and an optional wireless communication capability (see FIG. 15). In the preferred embodiment the wireless protocol is Bluetooth LE and the battery 46 is a coin cell battery 46.

3.3 volts are applied to the input trace with a pulldown resistor connected to ground between the input voltage and the variable resistor node set of three variable resistor pads. The signal out from each pad runs through an SPDT (Single Pole Double Switch) where one output is set to high impedance (High-Z) and in the other output the voltage is sent to an ADC (Analog to digital converter). Voltage is read through the ADC output lines successively (i.e., When each of the three parts of the nodes' output voltage is measured, the other two are set to High-Z), While this particular circuit is one embodiment, there are a variety of other circuits, which can be implemented to create different outputs. For example, using opAmps, one can create a circuit that linearizes the force response of the sensors or other circuits can be used to mitigate noise from ADC's or other external circuit elements.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A sensor comprising:
a layer comprising a plurality of clusters of sensing elements which sense shear force and compressive force on the layer; and
a computer in communication with the sensing elements which causes prompting signals to be sent to the sensing elements and reconstructs shear force and compressive force as measurements on the layer from data signals received from the sensing elements; and including a bump and a transmitter with each cluster of sensing elements and wherein each cluster of sensing elements comprising three electrically conductive and electrically isolated patches from each other which are placed at equidistant positions around and directly below the bump associated with the cluster of sensing elements, the transmitter in communication with the computer and the three patches, the bump having a conductor and each of the three patches having a conductor, with dielectric disposed between the conductor of the bump and each of the conductors of the three patches, when force is applied to the bump, the prompting signals pass from the conductor of the bump to the three patches corresponding to how the force is applied to the bump where the three patches send the data signals with the transmitter to the computer based on the prompting signals the three patches receive, shear forces and compressive forces are measured as differences in a sensed value within clusters by the computer from the data signals the computer receives.

2. The sensor of claim 1 wherein the computer reconstructs a continuous position of shear force on the layer from interpolation based on the data signals received from a grid extending across and in between the sensing elements as the force moves from one sensing element to another sensing element.

3. The sensor of claim 2 wherein the plurality of sensing elements are disposed in sensing strips, the sensing strips wrap around a curved object.

4. The sensor of claim 3 wherein the sensing strips wrap around a foot, and the computer is positioned in an arch of the foot.

5. A method for sensing forces comprising the steps of:
applying a force to a layer which includes a plurality of clusters of sensing elements which sense shear force and compressive force on the layer, and including a bump and a transmitter with each cluster of sensing elements and wherein each cluster of sensing elements comprising three electrically conductive and electrically isolated patches from each other which are placed at equidistant positions around and directly below the bump associated with the cluster of sensing elements, the transmitter in communication with the computer and the three patches, the bump having a conductor and each of the three patches having a conductor, with dielectric disposed between the conductor of the bump and each of the conductors of the three patches;
sending to the sensing elements prompting signals with a computer in communication with the sensing elements so when force is applied to the bump, the prompting signals pass from the conductor of the bump to the three patches corresponding to how the force is applied to the bump;
the three patches sending data signals with the transmitter to the computer based on the prompting signals the three patches receive; and
reconstructing shear forces and compressive forces on the layer as measurements by the computer from the data signals received from the sensing elements where shear forces and compressive forces are measured as differences in a sensed value within clusters.

* * * * *